United States Patent
Schroeder et al.

[11] Patent Number: 6,070,865
[45] Date of Patent: Jun. 6, 2000

[54] AIR GAP PRESETTING SENSOR HOLDER

[75] Inventors: Thaddeus Schroeder, Rochester Hills; Robin Stevenson, Bloomfield, both of Mich.

[73] Assignee: General Motors Corporation, Detroit, Mich.

[21] Appl. No.: 09/064,910

[22] Filed: Apr. 23, 1998

[51] Int. Cl.[7] .................................................. B23Q 1/00
[52] U.S. Cl. .............................. 269/47; 269/900; 269/47
[58] Field of Search ............................... 269/44, 46, 900; 403/13, 110, 404; 248/216.1, 200, 220.42, 225.52, 225.11, 300

[56] References Cited

U.S. PATENT DOCUMENTS

| 4,193,588 | 3/1980 | Doneaux ..................................... 269/47 |
| 5,475,062 | 12/1995 | Ishizaki et al. . |
| 5,951,191 | 9/1999 | Schroeder et al. ........................ 403/13 |
| 5,967,473 | 10/1999 | Singbartl ................................. 248/200 |

*Primary Examiner*—David A. Scherbel
*Assistant Examiner*—Lee Wilson
*Attorney, Agent, or Firm*—Margaret A. Dobrowitsky

[57] ABSTRACT

A bracket and sensor body of a magnetic sensor, wherein relative rotation therebetween provides precise setting of an optimal air gap, and wherein operation is very quick, easy and reliable and wherein the air gap setting is precisely repeated each time a magnetic sensor is replaced or re-installed. In a first preferred embodiment, the bracket is provided with a sensor aperture having a predetermined shape, and at least one cutting tab is provided at the sensor aperture which has a predetermined pitch angle relative to the plane of the bracket. The sensor body is composed of a relatively softer material, such as a plastic, which is cuttable by the harder material of the one or more cutting tabs, wherein the shape of the sensor body is generally complementary to the predetermined shape of the aperture. Rotation of the sensor body relative to the bracket causes the one or more cutting tabs to cut into the sensor body. Depending upon the pitch of the at least one cutting tab relative to the plane of the bracket, the sensor body moves relative to the bracket in a direction normal to the plane of the bracket. Various structures are utilizable to prevent over rotation, resist back rotation and assure proper initial orientation of the sensor body relative to the sensor aperture.

20 Claims, 8 Drawing Sheets

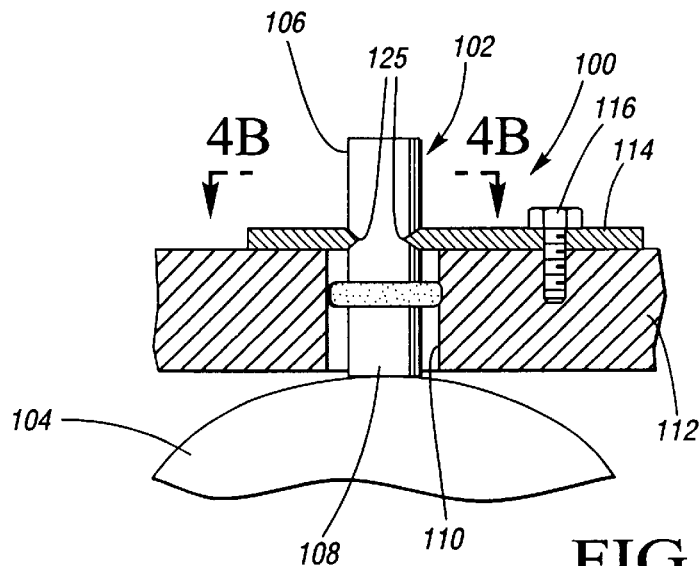
FIG. 4A
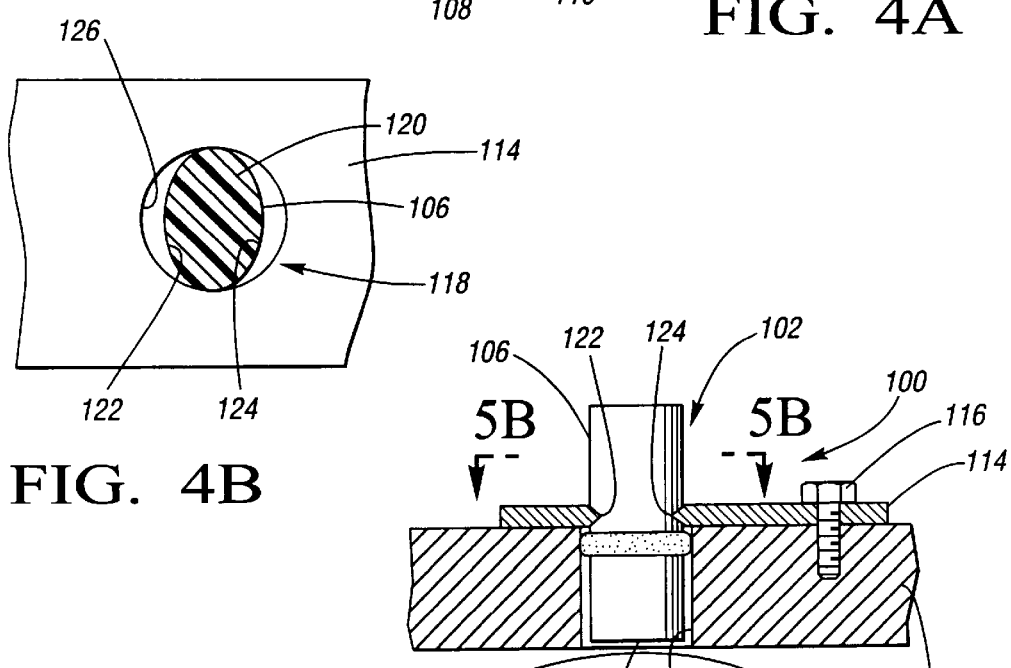
FIG. 4B
FIG. 5A
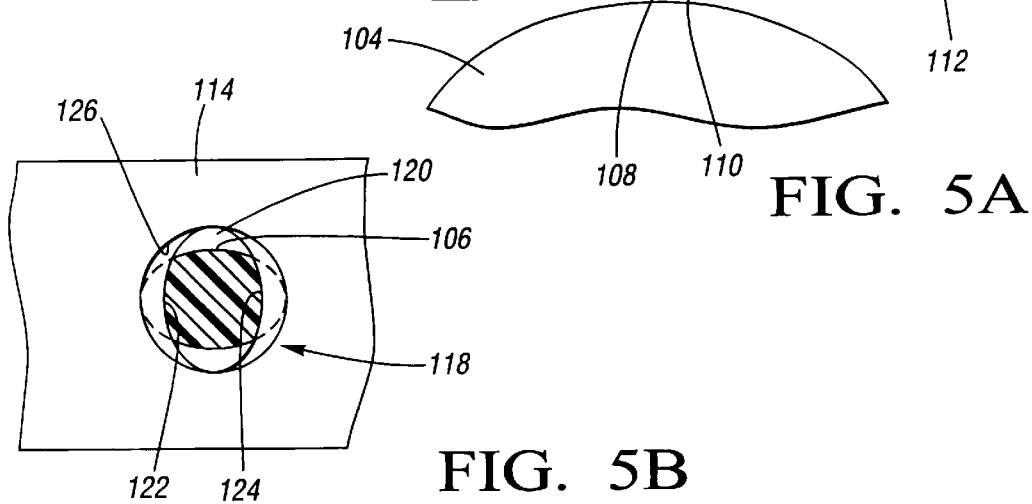
FIG. 5B

AIR GAP PRESETTING SENSOR HOLDER

TECHNICAL FIELD

The present invention relates to brackets for holding a first object with respect to a second object. More particularly, the present invention relates to a bracket for precisely locating a sensor relative to an object to be sensed. Still more particularly, the present invention relates to an apertured bracket and sensor body combination, wherein facial interaction between the bracket and the sensor body as one is rotated relative to the other results in the sensor housing moving a precisely predetermined distance relative to the bracket along an axis normal to the plane of the bracket, thereby automatically setting an air gap.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and reluctor on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement, wherein the stack-up of tolerances causes deviation from the optimal air gap. For example, a rigid bracket is affixed to the body of a magnetic sensor. The magnetic sensor is placed into a sensor port in the engine block, and the bracket is bolted, via a bolt hole in the bracket, to a threaded mounting hole in a mounting surface of the engine block. When the bracket is bolted, the length of the sensor body from the bolt hole of the bracket to the sensor tip determines the air gap with respect to the reluctor, which air gap is affected by the stack-up of tolerances. Even though subject to tolerance related placement inaccuracy, this structural mounting methodology is used widely because of the simplicity of the hardware, and ease of assembly and service.

In situations where air gap variation cannot be tolerated, the air gap is preset during magnetic sensor installation by means of an adjustable bracket, often referred to as a "side mount" bracket. The adjustability of side mount brackets resides in a bolt slot which allows for the bracket to be adjusted along the slot elongation relative to the threaded mounting hole of the mounting surface.

In one form of operation of side mount bracket, the sensor body is placed into the sensor port of the engine block such that the sensor tip is allowed to touch the surface of the reluctor, and then it is withdrawn a distance equal to the predetermined optimum air gap. This method is more time consuming and is error prone.

In another form of operation of side mount bracket, a sacrificial layer of soft abradable material is placed onto the sensor tip, wherein the thickness of the sacrificial layer is equal to the optimum air gap. Now, the installer need merely place the sensor body into the sensor port until the sensor tip touches the reluctor, and then tighten the bolt on the mounting surface with the sensor body retained at this position. During initial rotation of the reluctor, the sacrificial layer may abrade due to reluctor runout or differential thermal expansion without damage being incurred to the sensor body or the reluctor. The sacrificial layer may be either attached to the sensor body or be a part thereof, such as a protuberance, provided the sensor body is of a soft material. However, in the event the magnetic sensor must be re-installed, the abraded sacrificial layer will not be able to again provide position location as it was able to do when unabraded. Therefore, before dismounting the magnetic sensor, the bracket must be marked to indicate the correct position of the sensor body relative to the bolt so that when the magnetic sensor is re-installed the mark on the bracket can be sighted—not an exact procedure. In any event, should the sacrificial layer be exposed to a lubricating oil, the oil spray may carry the abraded debris into oil passageways.

An improved side mount bracket installation is disclosed in copending U.S. application Ser. No. 08/986,703, filed Jan. 22, 1997, assigned to the assignee of this application.

In the prior art, it is known to precisely adjust the air gap using a threaded sensor body and threaded sensor port. This structure is generally used exclusively with magnetic sensors having a single sensing element and having sensing capability unaffected by sensor rotation around its longitudinal axis. In this approach, the sensor tip is brought into touching engagement with the reluctor, and then the sensor body is rotated a predetermined angular amount, wherein the pitch angle of the threads raises the tip a distance equal to the optimum air gap. However, many automotive magnetic sensors contain more than one sensing element and are designed to operate at only one particular angular setting around the sensor axis. Consequently, a threaded sensor body would need to be adjusted in whole revolution steps (i.e., 360 degrees) and air gap adjustment would then be in steps of the thread pitch. While the use of a sufficiently small pitch may render the air gap setting resolution adequate, many sensors are precluded from rotation due to geometrical interferences and cost.

Accordingly, what is needed in the art is a structure for holding a magnetic sensor which allows easy and quick re-installation and removal of the magnetic sensor, and provides for automatic setting of an optimal air gap.

SUMMARY OF THE INVENTION

The present invention is a bracket and sensor body of a magnetic sensor, wherein relative rotation therebetween provides precise setting of an optimal air gap, and wherein operation is very quick, easy and reliable and wherein the air gap setting is precisely repeated each time a magnetic sensor is replaced or re-installed.

In a first preferred embodiment of the present invention, the bracket is provided with a sensor aperture having a predetermined shape, such as for example an elliptical shape. At least one cutting tab is provided at the sensor aperture. The at least one cutting tab is oriented at a predetermined pitch angle relative to the plane of the bracket. The sensor body is composed of a relatively softer material, such as a plastic, which is cuttable by the harder material of the one or more cutting tabs, wherein the shape of the sensor body is generally complementary to the predetermined shape of the aperture. The preferred cutting tab has a single cutting edge and is on the order of between, for example, about 3/32 to about 1/8 of an inch thick, or another selected thickness.

Rotation of the sensor body relative to the bracket causes the one or more cutting tabs to cut into the sensor body. Depending upon the pitch of the at least one cutting tab relative to the plane of the bracket, the sensor body moves relative to the bracket in a direction normal to the plane of the bracket. Various structures are utilizable to prevent over rotation, resist reverse rotation and assure proper initial orientation of the sensor body relative to the sensor aperture.

In an example of an environment of operation of the first preferred embodiment involving an automotive engine, the bracket is secured to an engine block, wherein the sensor aperture is aligned over a sensor port in the engine block. The sensor body is aligned so as to pass through both the sensor aperture and the sensor port until the tip thereof touches a magnetic reluctor to be sensed during operation of the engine.

Since the shape of the sensor body at the sensor aperture is complementary thereto, rotation of the sensor body must be accompanied by the material of the sensor body yielding to the relatively harder material of the one or more cutting tabs. Accordingly, when an installer rotates the sensor body relative to the bracket, the at least one cutting tab cuts into the sensor body. The cutting of the one or more cutting tabs into the sensor body results in the sensor body moving along an axis normal to the plane of the bracket. This movement will result in an air gap being formed between the tip of the sensor body and the reluctor. For example, to establish a predetermined optimal air gap in which the sensor body is to be rotated one-quarter of a revolution, the pitch of the one or more cutting tabs should be four times the predetermined optimal air gap.

In a second preferred embodiment of the present invention, the bracket and the sensor body are complementarily shaped whereby the relative rotation therebetween occurs without the sensor body rotating. In this regard, the bracket has a stationary bracket component and a rotatable bracket component. Each of the rotatable bracket component and the sensor body are provided with complementing splines which are relatively nestable with respect to each other. Each spline of the rotatable sensor bracket is in the form of a cutting tab having a predetermined pitch angle relative to the plane of the bracket. The stationary bracket component engages the sensor body to prevent relative rotation therebetween. The sensor body is placed into the sensor aperture whereby the splines of the sensor body are nested between the splines of the rotatable bracket component. When the rotatable bracket component is rotated, the cutting tabs thereof cut into the splines of the sensor body.

In an example of an environment of operation of the second preferred embodiment involving an automotive engine, the stationary bracket component is secured to the engine block, wherein the sensor aperture is aligned over a sensor port in an engine block. The sensor body is aligned so as to pass through both the sensor aperture and the sensor port, wherein the splines are nested relative to each other, until the tip of the sensor body touches a magnetic reluctor to be sensed during operation of the engine.

Since the splines are nested relative to each other, rotation of the rotatable bracket component must be accompanied by yielding of the softer material of the sensor body to the harder material of the cutting tabs. Accordingly, when an installer rotates the rotatable bracket component relative to the stationary bracket component (and the sensor body), the cutting tabs cut into the sensor body. Over rotation is prevented by an abutment of the stationary bracket component, and upon completion of rotation the rotatable bracket component is secured to the stationary bracket component (or engine block) to thereby prevent back rotation and affix the sensor body to the engine block.

The cutting of the cutting tabs into the sensor body results in the sensor body moving along an axis normal to the plane of the bracket. This movement will result in an air gap being formed between the tip of the sensor body and the reluctor. For example, to establish a predetermined optimal air gap in which the rotatable bracket component is to be rotated one-eighth of a revolution, the pitch of the blades should be eight times the predetermined optimal air gap.

Now, should the magnetic sensor require servicing, it can be removed and re-installed, or a new magnetic sensor can be installed in its place, using the installation procedure outlined above. In each case, the optimum air gap will be precisely achieved automatically.

Accordingly, it is an object of the present invention to provide a structure for holding one object relative to a second object, wherein a preset distance of separation with respect to a third object is automatically set.

It is a further object of the present invention to provide a bracket and sensor body combination, wherein a predetermined facial interaction between the bracket and the sensor body situated in an aperture of the bracket provides a predetermined movement of the sensor body relative to the bracket along an axis in response to relative rotation therebetween.

It is another object of the present invention to provide a bracket and sensor body combination, wherein the bracket has an aperture of a predetermined shape in which at least one cutting tab defines a part thereof, wherein the sensor body has a shape complementary to the sensor aperture, and wherein rotation of the sensor body relative to the bracket results in the at least one cutting tab cutting into the sensor body, whereby the sensor body moves relative to the bracket along an axis normal to the plane of the bracket, the magnitude of the movement being dependent upon selection of the pitch angle of the at least one cutting tab relative to the plane of the bracket.

It is yet an additional object of the present invention to provide a facially interactive bracket and sensor body combination for precisely locating a magnetic sensor relative to a reluctor, wherein the air gap therebetween is automatically set independent of stack-up of parts tolerances.

These, and additional objects, advantages, features and benefits of the present invention will become apparent from the following specification.

BRIEF DESCRIPTION OF THE DRAWINGS

FIG. 4A is a partly sectional side view of the bracket and sensor body combination as seen generally at FIG. 1, wherein the sensor body is placed into the sensor aperture and not yet rotated.

FIG. 4B is a partly sectional plan view, seen along line 4B—4B of FIG. 4A.

FIG. 5A is a partly sectional side view of the bracket and sensor body combination as seen generally at FIG. 1, wherein the sensor body has been placed into the sensor aperture and rotated so as to affix it relative to the bracket.

FIG. 5B is a partly sectional plan view, seen along line 5B—5B of FIG. 5A.

DESCRIPTION OF THE PREFERRED EMBODIMENT

Figure 1:
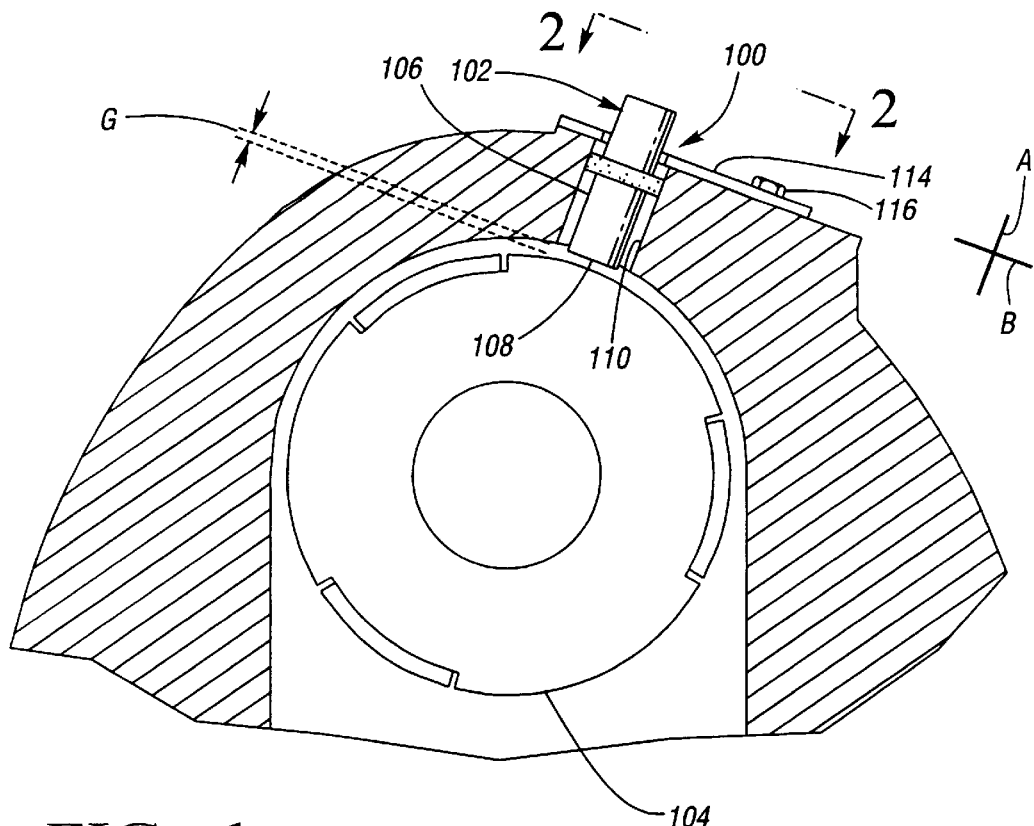
FIG. 1 is a partly sectional side view of the bracket and sensor body combination according to a first preferred embodiment of the present invention, shown in a typical environment of operation wherein a magnetic sensor is spaced from a reluctor a distance equal to an optimum air gap.

Referring now to the Drawing, FIGS. 1 through 15 depict a first embodiment of the present invention and FIGS. 16A through 17B depict a second embodiment of the present invention. In the first embodiment, a sensor body is rotated relative to a bracket; and in the second embodiment, a portion of a bracket is rotated relative to a sensor body. In each case, the relative rotation results in the softer material of the sensor body being cut by the harder material of the bracket along a predetermined pitch angle, the facial interaction therebetween resulting in the sensor body moving a predetermined distance along an axis which is normal to the plane of the bracket.

Referring now to FIGS. 1 through 5B a first form of the bracket and sensor body combination 100 according to the first embodiment of the present invention will be detailed.

FIG. 1 generally depicts the bracket and sensor body combination 100 in an exemplar environment of operation, wherein the bracket and sensor body combination serves to locate a magnetic sensor 102 with respect to a reluctor 104. In this regard, the magnetic sensor 102 has a sensor body 106 which includes a sensor tip 108. The sensor tip 108 extends into a sensor port 110 of an engine block 112 and is spaced from the reluctor 104 a predetermined distance equal to an optimum air gap G which provides optimal sensing performance by the magnetic sensor of magnetic field variations as the reluctor spins.

Figure 2:
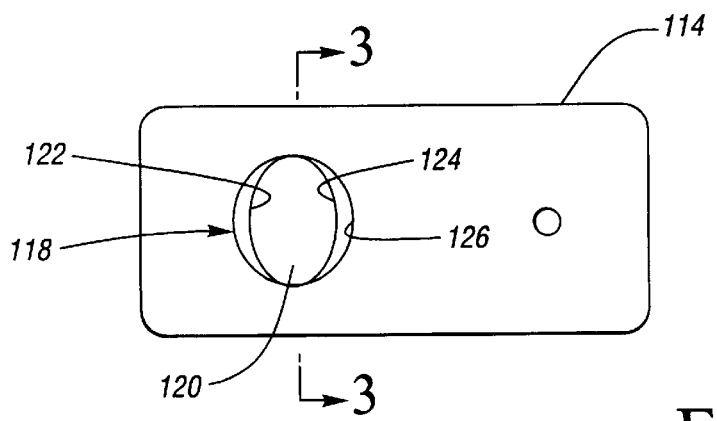
FIG. 2 is a top plan view of a bracket according to the first preferred embodiment of the present invention.

The bracket 114 of the bracket and sensor body combination 100 is affixed to the engine block 112 via a mounting bolt 116, as show at FIG. 2. The bracket 114 has a sensor aperture 118 formed therein having an opening 120 of a predetermined shape. In this regard, a pair of opposing cutting tabs 122, 124 are located at the sensor aperture 118 which at least in part define the shape of the opening 120. The cutting tabs 122, 124 are each configured relative to the sensor aperture so that the opening 120 is elliptically shaped and the untabbed aspect 126 of the sensor aperture is circular. The cutting tabs 122, 124 are preferred to have a single cutting edge or tooth and be, for example, on the order of about 3/32 to about 1/8 of an inch thick.

Figure 3:
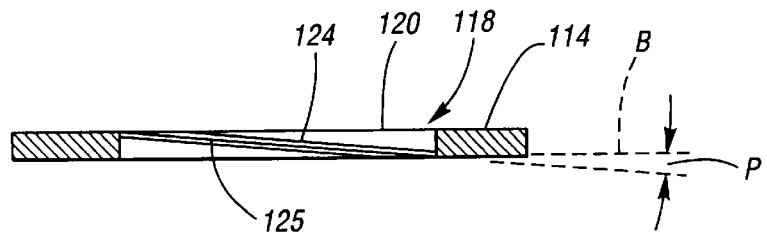
FIG. 3 is a partly sectional side view of the bracket, seen along line 3—3 in FIG. 2.

As best shown at FIG. 3, both of the cutting tabs 122, 124 have the same predetermined pitch angle P, preferably an acute angle greater than zero degrees, wherein the pitch is defined by the angle with which the cutting tab and its associated cutting edge 125 are oriented with respect to the bracket plane B of the bracket 114.

The sensor body 106 has a shape complementary to that of the predetermined shape of the opening 120, so as to generally fit therein in a loosely snug manner. While the entire sensor body 106 need not be so shaped, that portion of which that is adjacent the bracket 114 is so shaped. Preferably, the sensor body is captured on the bracket, yet is axially movable in relation thereto within predetermined limits of movement, such as for example via selective cross-sectional variance of the sensor body relative to the opening at the sensor aperture. An advantage of capturing the sensor body to the bracket is that the orientation of the sensor body to the bracket is preselected prior to installation on the engine block. The bracket 114 and the cutting tabs thereof 122, 124 are composed of a material which is harder than the material of the sensor body 106. For example, the cutting tabs 122, 124 may be composed of steel while the sensor body is composed of a scorable plastic having a hardness substantially less than steel.

In operation of the bracket and sensor body combination 100, the sensor body 106 is oriented so that the ellipse thereof is aligned with the ellipse of the sensor aperture 118. Then, as shown at FIGS. 4A and 4B the sensor body is placed into the sensor aperture and sensor port 110 until the sensor tip 108 touches the reluctor 104. Next, as shown at FIGS. 5A and 5B the sensor body is rotated (for example) ninety degrees (that is, one-quarter turn) whereupon the ellipses of the sensor body and the sensor aperture are oriented normal to each other.

As can be seen at FIG. 4B, any rotation of the sensor body must result in the cutting tabs 122, 124 cutting thereinto. Consequently, as the sensor body rotates, the cutting tabs cut into the sensor body along the predetermined pitch angle of the cutting tabs relative to the bracket plane. Since the cutting of the sensor body is parallel to the cutting tabs, the sensor body moves away from the reluctor along an axis A that is normal to the bracket plane (see FIG. 1). Accordingly, the pitch angle of the cutting tabs is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance.

The sensor body may be removed by reverse rotation and may then be replaced or a new sensor body may be installed by the procedure outlined above.

With attention now directed to FIGS. 6 through 15, alternative forms of the bracket and sensor body combination will be detailed which variously address preventing over rotation, resisting reverse rotation and/or alignment issues.

Figure 6:
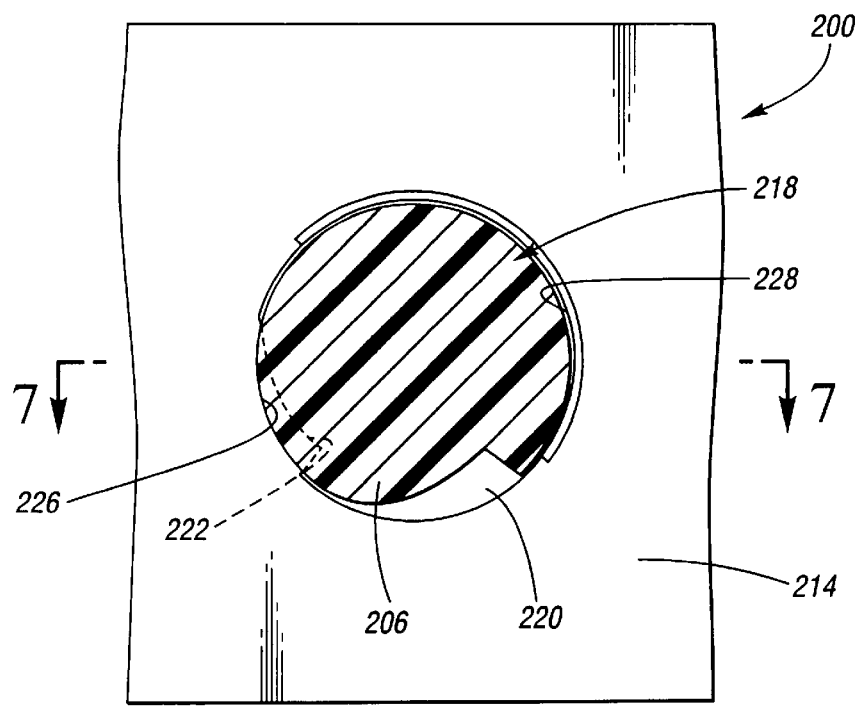
FIG. 6 is a top plan view, partly broken away, of a first alternative form of bracket and sensor body combination according to the first embodiment of the present invention.
Figure 7:
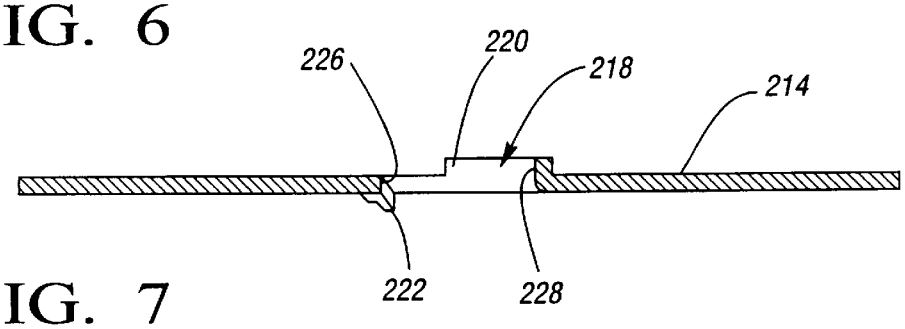
FIG. 7 is a partly sectional side view, seen along line 7—7 in FIG. 6, wherein the sensor body is not shown.

FIGS. 6 and 7 depict a first alternative form 200 of the first embodiment of the present invention, wherein a bracket 214 has a sensor aperture 218, wherein a single cutting tab 222 defines a part thereof. The cutting tab 222 attaches at the circular aspect 226 of the sensor aperture 218 and is provided with a predetermined pitch angle as discussed hereinabove. Opposite the cutting tab 222 is a reaction wall 228 for accepting lateral cutting forces and thereby preventing tilting of the sensor body. The reaction wall 228 is preferred to be configured as an upstanding semi-circular flange which is formed by a flanging process well known in the art.

While the sensor body 206 of the magnetic sensor may be elliptically shaped, as discussed hereinabove, the sensor body is depicted in a shape complementary to the shape of the opening 220 of the sensor aperture 218. Since the mutual shapes are not symmetrical, the installer can orient the sensor body relative to the sensor aperture only one possible way or else the sensor body will not fit into the sensor aperture. This assures the magnetic sensor will have only one possible orientation with respect to the reluctor. On the other hand, if an elliptical shape is used for the sensor body (as depicted hereinabove for example), then the sensor body could be insertable into the sensor aperture in either of two opposite directions. This is a consideration where the orientation of the magnetic sensor is critical to its proper operation with respect to the reluctor.

Upon being placed into the sensor aperture 218 and rotated with respect thereto, the cutting tab 222 will cut into the sensor body 206, while the reaction wall 228 accepts the reaction force as the cutting tab cuts the sensor body. As indicated hereinabove, the cutting of the sensor body is parallel to the cutting tab, whereupon the sensor body will move away from the reluctor along an axis normal to the plane of the bracket. Accordingly, the pitch of the cutting tab is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance.

Figure 8:
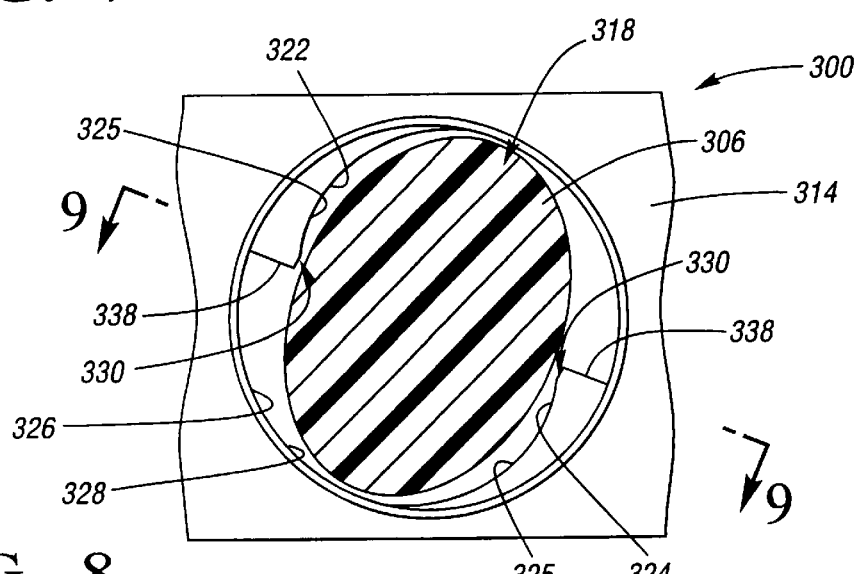
FIG. 8 is a top plan view, partly broken away, of a second alternative form of bracket and sensor body combination according to the first embodiment of the present invention.
Figure 9:
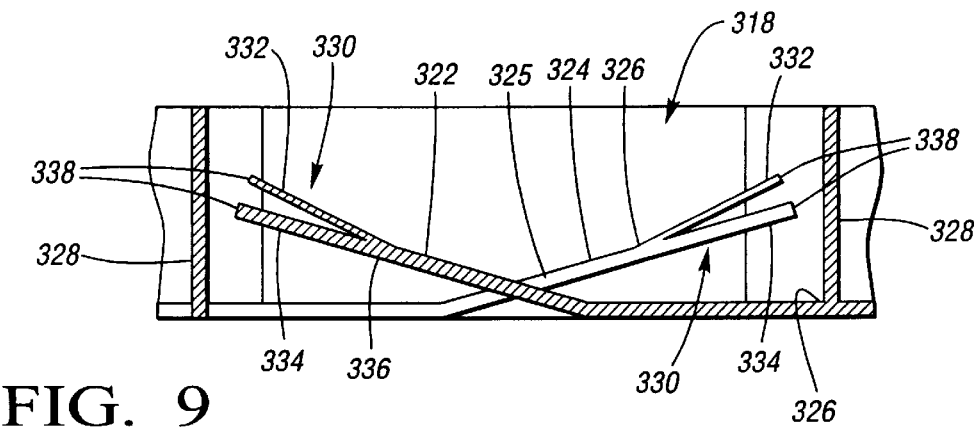
FIG. 9 is a partly sectional side view, seen along line 9—9 in FIG. 8, wherein the sensor body is not shown.

FIGS. 8 and 9 depict a second alternative form 300 of the first embodiment of the present invention, wherein a bracket 314 has a sensor aperture 318, wherein a pair of opposing cutting tabs 322, 324 define a part thereof. The cutting tabs 322, 324 attach at the circular aspect 326 of the sensor aperture 318 and are provided with a predetermined pitch angle as discussed hereinabove.

In order to resist reverse rotation of the sensor body 306 with respect to the cutting tabs 322, 324 after installation, such as due to vibration induced creep, the end portion 328 of the cutting tabs 322, 324 are each provided with split-tails 330. The tails 332, 334 of each spilt-tail 330 merge smoothly at a location 336 spaced from the cutting tab end 338 and resiliently diverge therefrom to a maximum divergence at the cutting tab end. Accordingly, forward rotation of the sensor body in a direction toward the cutting tab end 338 (i.e., counterclockwise in FIG. 8) results in the tails 332, 334 being resiliently forced by riding in the groove formed in the sensor body 306 by cutting action of the respective cutting edges 325 of the cutting tabs 322, 324. However, since the tails 332, 334 tend to resiliently diverge from each other, reverse rotation of the sensor body (i.e., clockwise in FIG. 8) will result in the tails tending to dig into the sensor body groove at the cutting tab end, preventing reverse rotation.

While the sensor body 306 of the magnetic sensor may be elliptical, as shown, it may be otherwise shaped. A reaction wall 328 is preferably provided at the aspect 326 of the sensor aperture 318.

Upon the sensor body 306 being placed into the sensor aperture 318 and rotated with respect thereto, the cutting tabs 322, 324 will cut into the sensor body, with the reaction wall 328 accepting lateral forces as the cutting tabs cut the sensor body. As indicated hereinabove, the cutting of the sensor body is parallel to the cutting tabs, whereupon the sensor body will move axially away from the reluctor. Accordingly, the pitch of the cutting tabs is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance.

Figure 10:
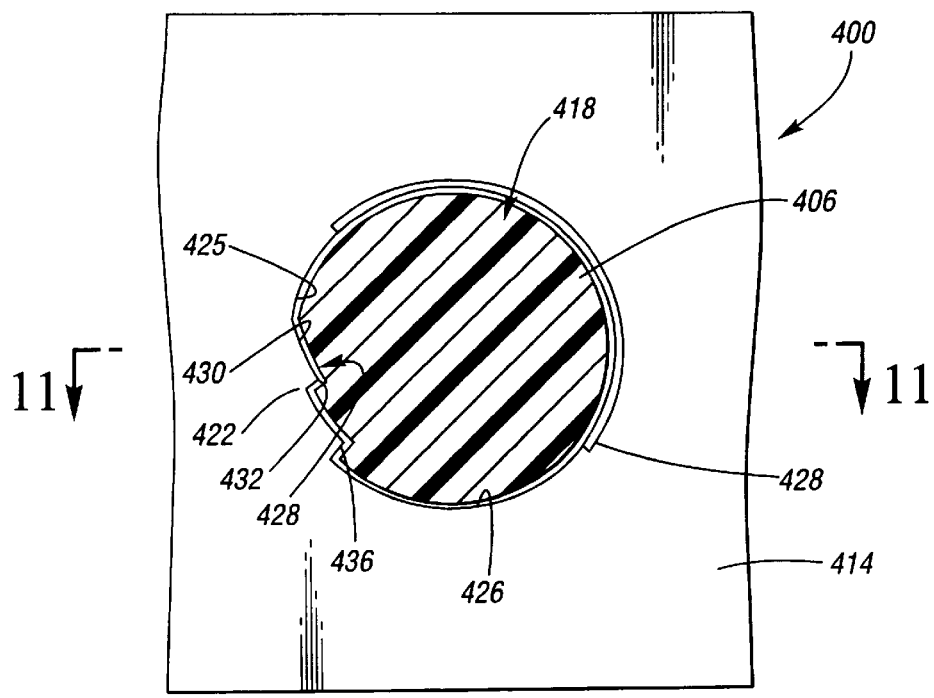
FIG. 10 is a top plan view, partly broken away, of a third alternative form of bracket and sensor body combination according to the first embodiment of the present invention.
Figure 11:
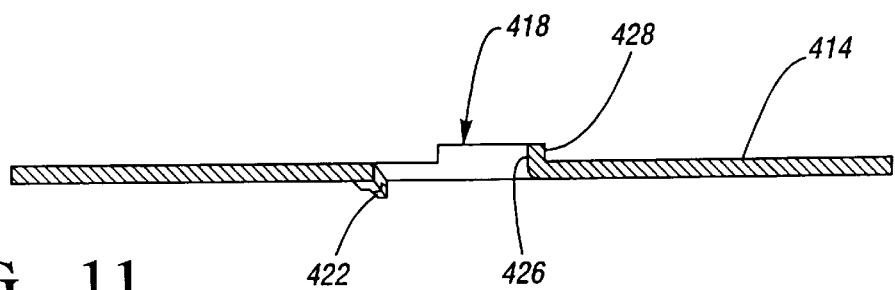
FIG. 11 is a partly sectional side view, seen along line 11—11 in FIG. 10, wherein the sensor body is not shown.

FIGS. 10 and 11 depict a third alternative form 400 of the first embodiment of the present invention, wherein a bracket 414 has a sensor aperture 418, wherein a cutting tab 422 defines a part thereof. The cutting tab 422 attaches at the circular aspect 426 of the sensor aperture 418 and is provided with a predetermined pitch angle as discussed hereinabove.

In order to resist reverse rotation of the sensor body 406 with respect to the cutting tab 422 after installation, such as due to vibration induced creep, the end portion 428 of the cutting tab 422 is provided with a blunt edge 430 and an abutment 432 at a portion of the cutting tab spaced from the cutting tab end 436. Accordingly, forward rotation of the sensor body in a direction toward the cutting tab end 436 (i.e., counterclockwise in FIG. 10) results in the blunt edge 430 deformingly pressing into the groove formed in the sensor body 406 by cutting action of the cutting edge 425 of the cutting tab 422. However, once rotation stops, the material of the sensor body 406 will relax and creep over and around the abutment 432, thereby serving to prevent the sensor body from reversely rotating.

The sensor body 406 of the magnetic sensor is shown by way of example as complementarily shaped with respect to the sensor aperture, thereby allowing only one insertion orientation, as discussed hereinabove. A reaction wall 428 is provided at the aspect 426 of the sensor aperture to accept the reaction force as the cutting tab cuts into the sensor body.

As the sensor body 406 is rotated with respect to the bracket, the cutting tab 422 will cut into the sensor body, with the reaction wall 428 accepting the reaction force generated thereby. As indicated hereinabove, the cutting of the sensor body is parallel to the cutting tab, whereupon the sensor body will move axially away from the reluctor. Accordingly, the pitch of the cutting tab is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance.

Figure 12A:
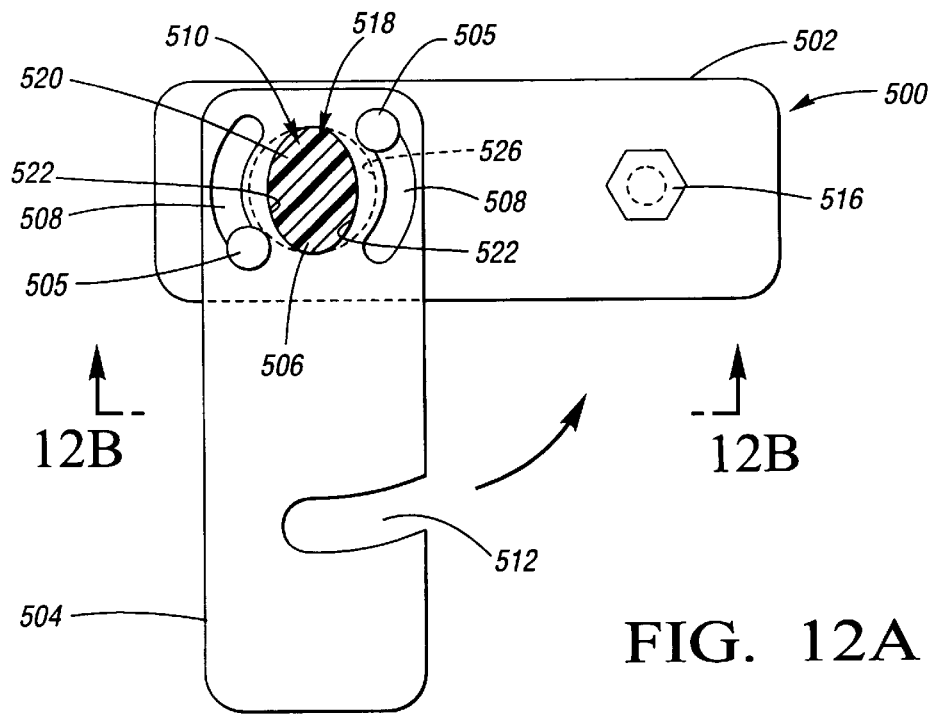
FIG. 12A is a top plan view of a fourth alternative form of bracket and sensor body combination according to the first embodiment of the present invention.
Figure 12B:
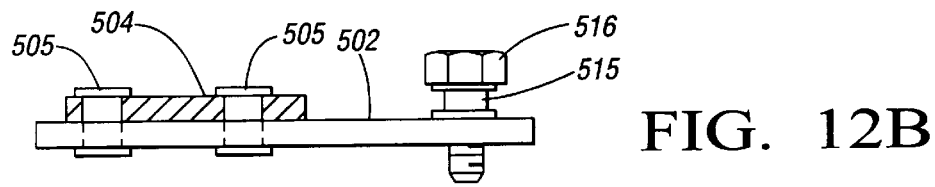
FIG. 12B is a partly sectional side view, seen along line 12B—12B in FIG. 12A, wherein the sensor body is not shown.
Figure 15:
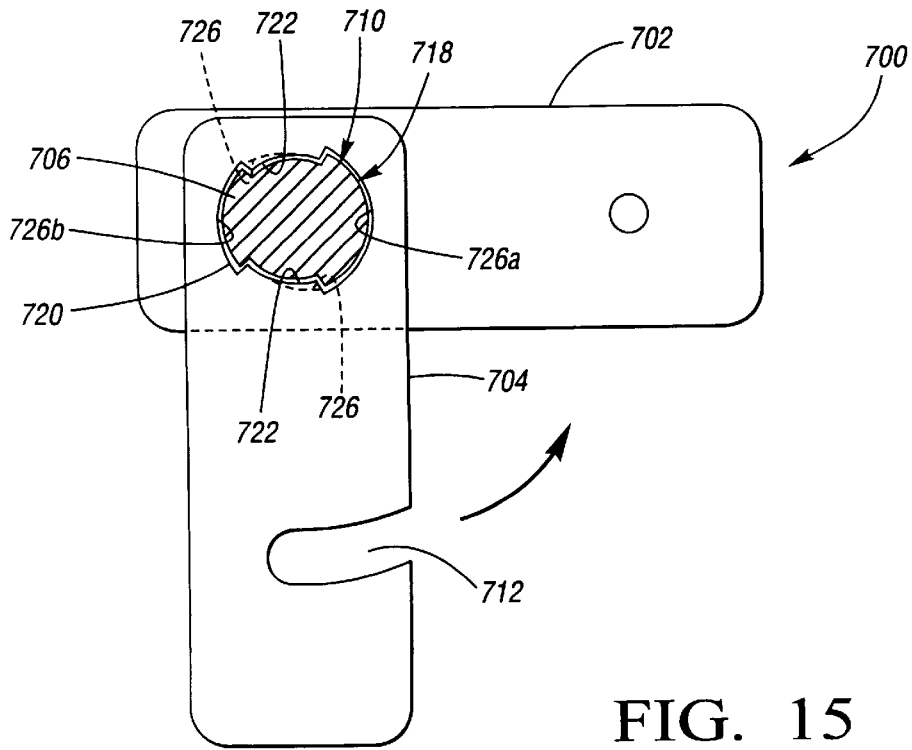
FIG. 15 is a partly sectional plan view of a sixth alternative form of bracket and sensor body according to the first embodiment of the present invention.

FIGS. 12A and 12B depict a fifth alternative form of the first embodiment of the present invention, wherein a bracket 500 has two components: a stationary bracket component 502 and a rotatable bracket component 504. The rotatable bracket component 504 is preferably permanently affixed to the stationary bracket component 502, such as via rivets 505 traveling in curved slots 508. A sensor aperture 518, wherein a pair of cutting tabs 522 define a part thereof, is provided in the stationary bracket component 502. The cutting tabs 522 attach at the circular aspect 526 of the sensor aperture 518 and are provided with a predetermined pitch angle as discussed hereinabove. The rotatable bracket component 504 is provided with a secondary sensor aperture 510 (without cutting tabs) which complementarily conforms to the local shape of the sensor body 506 so as to engage the sensor body analogously as a wrench engages a nut for serving as a tool to rotate the sensor body relative to the stationary bracket component 502.

In order to prevent over rotation and resist reverse rotation of the sensor body 506 with respect to the cutting tabs 522, the rotatable bracket component 504 has a slot 512 which engages the mounting bolt 516 and seats in relation thereto at the blind end of the slot. In order to affix the stationary bracket component 502 prior to engagement with the rotatable bracket component 504, the mounting bolt 516 is located via a grommet 515 which is received by the slot 512.

The sensor body 506 of the magnetic sensor, sensor aperture opening 520 and secondary sensor aperture 510 are shown by way of example as being elliptically shaped; other shapes may be used.

The sensor body 506 is rotated with respect to the stationary bracket component 502 via the installer rotating the rotatable bracket component 504. During rotation, the cutting tabs 522 will cut into the sensor body. As indicated hereinabove, the cutting of the sensor body is parallel to the cutting tabs, whereupon the sensor body will move axially away from the reluctor. Accordingly, the pitch of the cutting tabs is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance. After rotation is completed the mounting bolt is further tightened, squeezing the grommet and thereby engaging the rotatable bracket component.

Figure 13A:
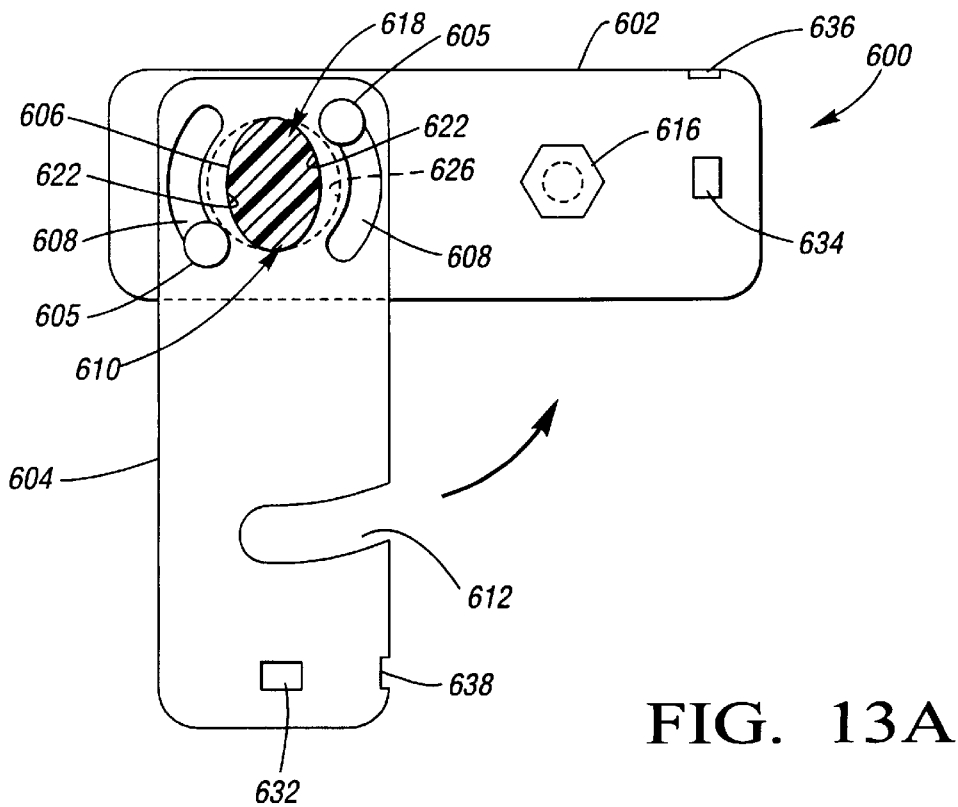
FIG. 13A is a top plan view of a fifth alternative form of bracket and sensor body combination according to the first embodiment of the present invention, shown prior to rotating the sensor body via a rotatable bracket component.
Figure 13B:
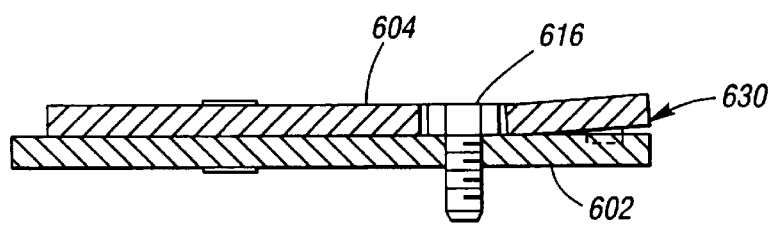
FIG. 13B is a side view of the fifth alternative form of the bracket and sensor combination according to the first embodiment of the present invention, shown after rotation of the rotatable bracket component thereof, wherein the sensor body is not shown.
Figure 14:
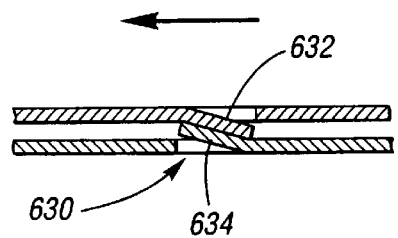
FIG. 14 is a partly broken away, sectional end view of the fifth alternative form of the first embodiment of the present invention, showing in particular snap interface thereof.

FIGS. 13A through 14 depict a sixth alternative form of the first embodiment of the present invention, wherein a bracket 600 again has two components: a stationary bracket component 602 and a rotatable bracket component 604. The rotatable bracket component 604 is preferably permanently affixed to the stationary bracket component 602, such as via rivets 605 traveling in curved slots 608. A sensor aperture 618, wherein a pair of cutting tabs 622 define a part thereof, is provided in the stationary bracket component 602. The cutting tabs 622 attach at the circular aspect 626 of the sensor aperture 618 and are provided with a predetermined pitch angle as discussed hereinabove. The rotatable bracket component 604 is provided with a secondary sensor aperture 610 (without cutting tabs) which complementarily conforms to the local shape of the sensor body 606 so as to engage the sensor body analogously as a wrench engages a nut for serving as a tool to rotate the sensor body relative to the stationary bracket component 602.

In order to prevent over rotation and resist reverse rotation of the sensor body 606 with respect to the cutting tabs 622, the rotatable bracket component 604 has a slot 612 which receives the head of the mounting bolt 616, and a resilient snap interface 630 therebetween affixes the rotatable bracket component to the stationary bracket component 602. As shown best at FIG. 14, the rotatable and stationary bracket components 602, 604 are provided with oppositely directed bosses 632, 634 which are mutually engaging. The bosses 632, 634 may be provided, for example, by a pierce and bend process. The bend of the bosses 632, 634 allows them to be mutually slid into engagement with each other when the rotatable bracket component is rotated toward the mounting bolt 616, but resists reverse rotation thereof when mutually engaged because of an interference therebetween.

The sensor body 606 of the magnetic sensor, sensor aperture opening 620 and secondary sensor aperture 610 are shown by way of example as being elliptically shaped; other shapes may be used.

The sensor body 606 is rotated with respect to the stationary bracket component 602 via the installer rotating the rotatable bracket component 604. During rotation, the cutting tabs 622 will cut into the sensor body. As indicated hereinabove, the cutting of the sensor body is parallel to the cutting tabs, whereupon the sensor body will move axially away from the reluctor. Accordingly, the pitch of the cutting tabs is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance. The end of rotation of the rotatable bracket component 604 is defined when an upstanding flange 636 of the stationary bracket component 602 abuts a recess 638 of the rotatable bracket component. At the end of rotation, the snap interface will automatically snap-lock the rotatable bracket component with respect to the stationary bracket component.

As mentioned hereinabove, it may be preferred to have the sensor body and the sensor aperture shaped asymmetrically so that the sensor body can only fit into the sensor aperture in one orientation with respect thereto. Similar to the examples of the fifth and sixth forms 500, 600 of the first embodiment discussed above, FIG. 15 depicts a seventh form 700.

A bracket 700 has two components: a stationary bracket component 702 and a rotatable bracket component 704. The rotatable bracket component 704 is independent of the stationary bracket component 702, but can be affixed thereto as discussed hereinabove. A sensor aperture 718, wherein a pair of cutting tabs 722 define a part thereof, is provided in the stationary bracket component 702. The cutting tabs 722 attach at the aspect 726 of the sensor aperture 718, which in this case involves a large radius circle portion 726*a* and a small radius circle portion 726*b*. The cutting tabs 722 are provided with a predetermined pitch angle as discussed hereinabove. The rotatable bracket component 704 is provided with a secondary sensor aperture 710 (without cutting tabs) which complementarily conforms to the local shape of the sensor body 706 so as to engage the sensor body analogously as a wrench engages a nut for serving as a tool to rotate the sensor body relative to the stationary bracket component 702.

In order to prevent over rotation and resist reverse rotation of the sensor body 706 with respect to the cutting tabs 722, the rotatable bracket component 704 has a slot 712 which engages the same mounting bolt (not shown) used to engage the stationary bracket component to the engine block.

The stationary bracket component 702 is held from rotating by the mounting bolt (the head thereof being separated from the engine block to accommodate the rotatable bracket component), and upon the sensor body 706 being placed into the sensor aperture 718 and secondary sensor aperture 710 (it can only be placed therein in the one orientation depicted), it is rotated with respect to the stationary bracket component 702 via the installer rotating the rotatable bracket component 704. During rotation, the cutting tabs 722 will cut into the sensor body. As indicated hereinabove, the cutting of the sensor body is parallel to the cutting tabs, whereupon the sensor body will move axially away from the reluctor. Accordingly, the pitch of the cutting tabs is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance. After rotation is completed the mounting bolt secures the stationary and rotatable bracket components.

Referring now to FIGS. 16A through 17B a second embodiment 800 of the bracket and sensor body combination according to the present invention is depicted. In this regard, a bracket 802 has a stationary bracket component 804 and a rotatable bracket component 806, wherein the rotatable bracket component is provided with a sensor aperture 808. Both the sensor aperture 808 and the sensor body 810 are provided, respectively, with mutually interfacing splines 812, 814.

The stationary bracket component 804 is generally Z-shaped, having an upper level 804*a*, a lower level 804*b* and a vertical section 804*c* therebetween. The lower level 804*b* is attached to an engine block 816 via a mounting bolt 818. The upper level 804*a* has a pair of fingers 820 having depending bosses 822. The sensor body 810 has a pair of seats 824 which receive the bosses 822 so that the sensor body is rotatively immobile with respect to the stationary bracket component 804.

The rotatable bracket component 806 has a base 826 and an arm 828 extending outwardly therefrom. Each of the splines 812 of the sensor aperture 808 has a cutting tab 830 that forms at least a portion thereof, wherein, preferably, the cutting tab forms and defines the spline. The cutting tabs 830 attach at the aspect 825 of the sensor aperture 808. The cutting tabs 830 are provided with a predetermined pitch angle as discussed hereinabove with respect to the first preferred embodiment.

Figure 16A:
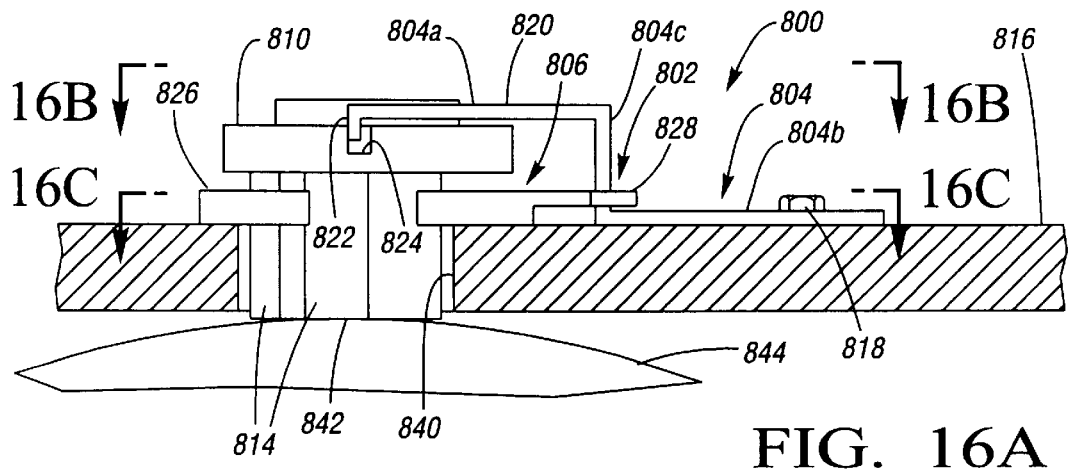
FIG. 16A is a partly sectional side view of a second embodiment of the bracket and sensor body combination according to the present invention, shown in a typical environment of operation wherein a magnetic sensor is about to be spaced from a reluctor a distance equal to an optimum air gap.
Figure 16B:
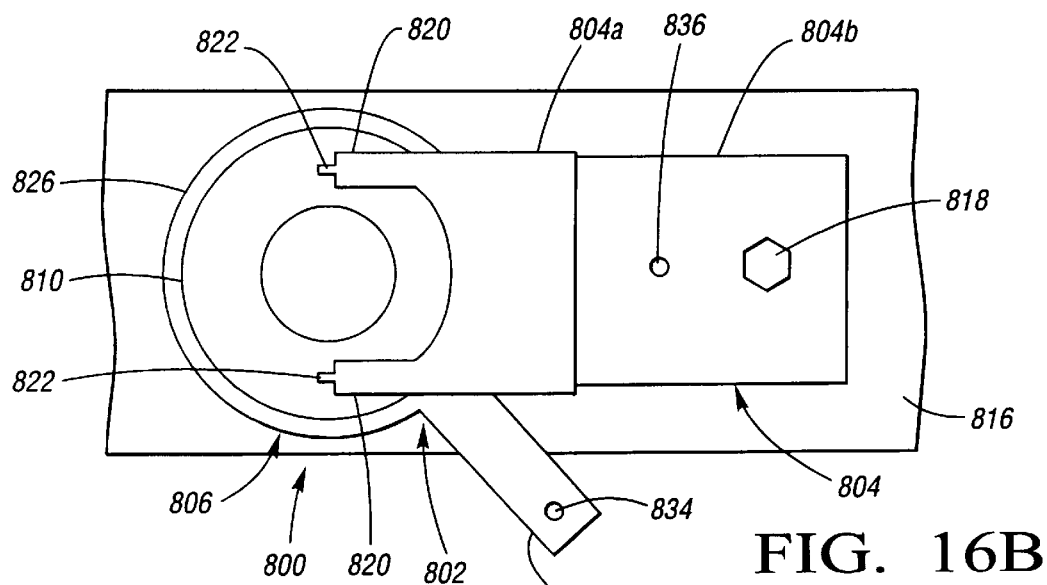
FIG. 16B is a top plan view, seen along line 16B—16B of FIG. 16A.
Figure 16C:
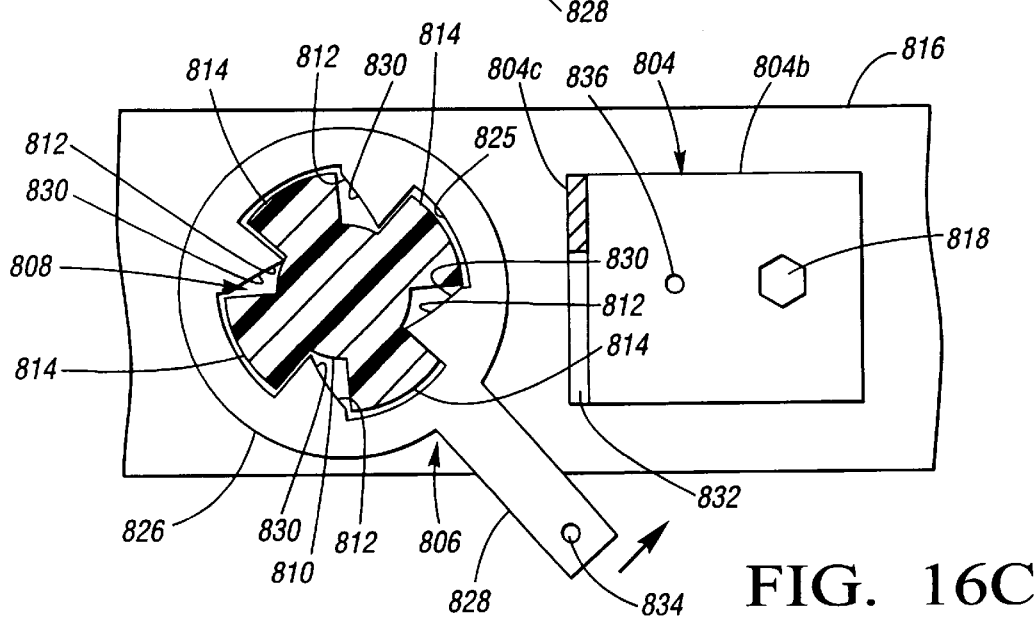
FIG. 16C is a partly sectional top plan view, seen along line 16C—16C of FIG. 16A.
Figure 17A:
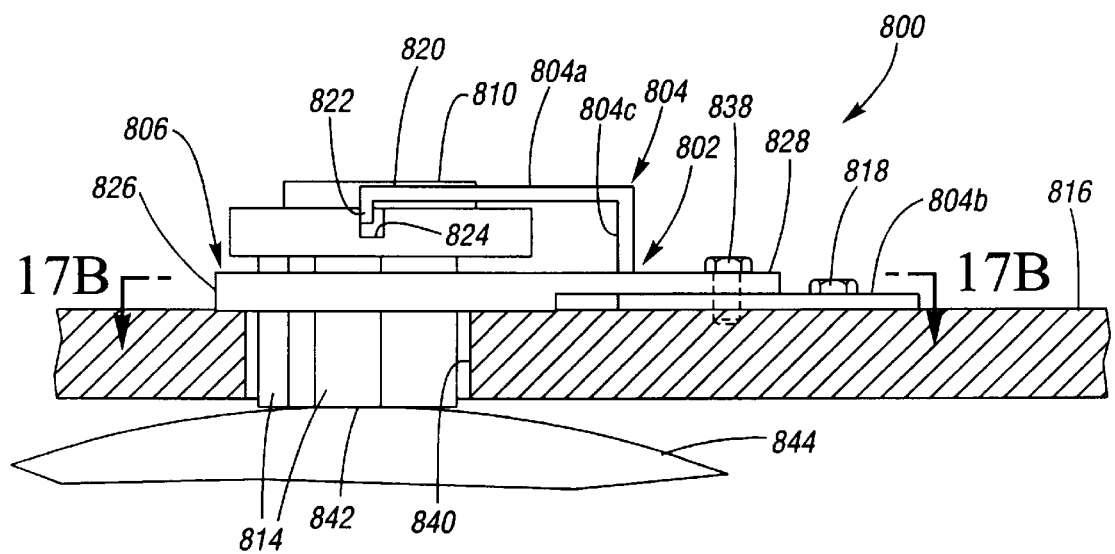
FIG. 17A is a partly sectional side view of the second embodiment of the bracket and sensor body combination according to the present invention, as generally shown at FIG. 16A, wherein now a magnetic sensor has been spaced from the reluctor a distance equal to the optimum air gap.
Figure 17B:
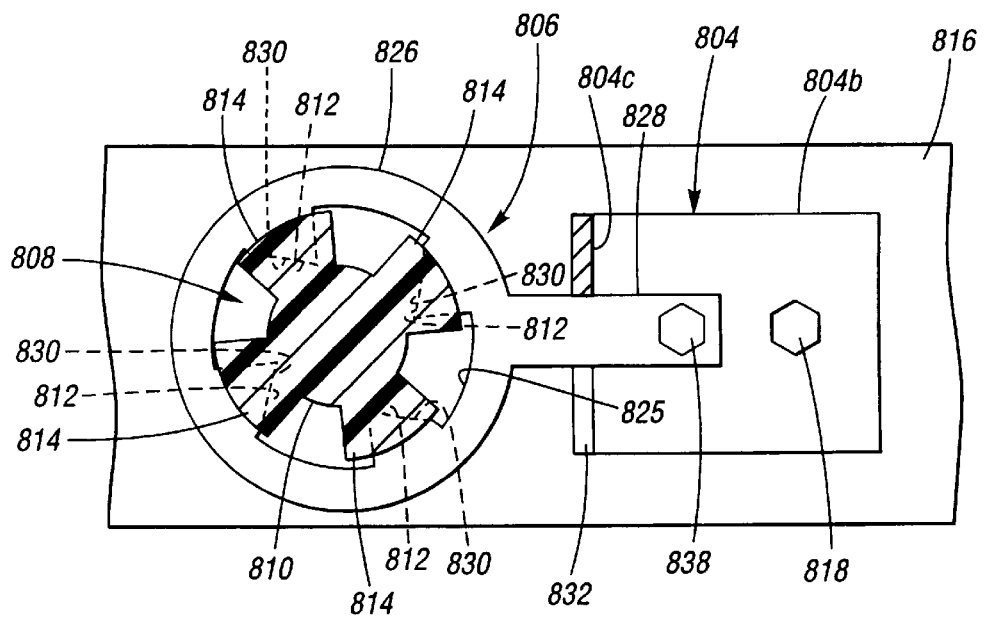
FIG. 17B is a partly sectional top plan view, seen along line 17B—17B of FIG. 17A.

The splines 814 of the sensor body 810 are configured so as to be nestable with respect to the splines 812 of the sensor aperture 808, as best depicted at FIG. 16C. Accordingly, when the rotatable bracket component 806 is rotated with respect to the sensor body 810, the cutting tabs 830 (which are structurally the splines 812 of the rotatable bracket component) cut into the softer material of the splines 814 of the sensor body.

In order to prevent over rotation and resist reverse rotation of the rotatable bracket component 806, as the arm 828 thereof is rotated it is received by a slot 832 formed in the vertical section 804*c* of the stationary bracket component 804. Rotation is stopped when the blind end of the slot 832 abuts the arm 828. At this location (see FIGS. 17A and 17B), the arm 828 overlies the lower level 804*b* of the stationary bracket component 804 and an affixment hole 834 thereof aligns with an affixment hole 836 of the stationary bracket component. An affixment bolt 838 (see FIG. 17A) then affixes the arm to the stationary bracket component 804 and/or the engine block 816.

In operation, the sensor body 810 is placed into the sensor port 840 of the engine block 816 so that the tip 842 thereof rests upon the reluctor 844 (see FIG. 16A). At this position, the splines 812 of the rotatable bracket component 806 mesh with the splines 814 of the sensor body 810 and the bosses 822 of the fingers 820 of the stationary bracket component 804 are received by the seats 824 formed in the sensor body. The stationary bracket component 804 is then affixed to the engine block 816 by the mounting bolt 818.

The arm 828 is then rotated, whereupon the cutting tabs 830 will cut into the splines 814 of the sensor body 810, since the bosses 822 prevent the sensor body from rotating. As indicated hereinabove, the cutting of the sensor body 810 is parallel to the cutting tabs 830, whereupon the sensor body will move axially away from the reluctor 844. Accordingly, the pitch of the cutting tabs is predetermined so that when the sensor body is rotated a preselected amount, the sensor tip will be separated from the reluctor a distance equal to the predetermined optimum air gap. Thus in this example, since the sensor body is rotated ninety degrees, the pitch must be set at four times the optimum air gap distance so that a one-quarter turn of the sensor body relative to the bracket will move the sensor body the optimum air gap distance.

The affixment bolt 838 is now threaded in place to secure the arm in position relative to the stationary bracket component.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A bracket and body combination for automatically positioning a body relative to a bracket along an axis normal to the bracket responsive to relative rotation between the bracket and the body, said combination comprising:

a bracket having an aperture providing an opening of predetermined aperture shape, said bracket having at least one cutting tab at said aperture which defines at least a portion of said opening thereof; and a body composed of a material softer tan said at least one cutting tab, said body having a predetermined body shape wherein said body at said predetermined body shape is insertable into said opening;

wherein rotation of one of said bracket and said body relative to the other of said one of said bracket and said body results in said at least one cutting tab cutting into said body at said predetermined body shape.

2. The combination of claim 1, wherein said bracket has a bracket plane; wherein said at least one cutting tab comprises at least one tooth having a predetermined pitch angle relative to the bracket plane; and wherein as said body is cut by said at least one cutting tab during said relative rotation the cut is parallel to said pitch angle.

3. The combination of claim 2, further comprising means for allowing movement of said body along an axis normal to the bracket plane in response to said rotation of said one of said one of said bracket and said body, and for preventing rotation of said other of said bracket and body.

4. The combination of claim 3, wherein said pitch angle is an acute angle greater than zero degrees.

5. The combination of claim 4, wherein said bracket further comprises reaction wall means formed at said aperture for accepting reaction force produced while said at least one cutting tab cuts into said body.

6. The combination of claim 4, wherein said at least one cutting tab comprises a pair of mutually opposing cutting tabs.

7. The combination of claim 4, wherein said at least one tooth comprises a single tooth.

8. The combination of claim 4, further comprising body alignment means for providing a predetermined orientation of said body with respect to said aperture when said body is inserted thereinto.

9. The combination of claim 8, wherein said body alignment means comprises predetermined asymmetrically complementing shapes of said predetermined aperture shape and said predetermined body shape.

10. The combination of claim 4, further comprising means for defining a limit of rotation of one of said bracket and said body with respect to the other of said bracket and said body.

11. The combination of claim 4, further comprising means for resisting reverse rotation between said bracket and said body after said relative rotation.

12. The combination of claim 11, wherein said means for resisting comprises a split-tail located on said at least one cutting tab.

13. The combination of claim 11, wherein said means for resisting comprises said at least one cutting tab comprising:

a cutting edge portion;

a blunt edge portion adjoining said cutting edge portion; and an abutment adjoining said blunt edge portion remote from said cutting edge portion.

14. The combination of claim 4, wherein said bracket comprises:

a stationary bracket component for being affixed in non-moving relation to a selected object, said stationary bracket component having said aperture and said at least one cutting tab; and a rotatable bracket component having a secondary aperture, said secondary aperture having a shape substantially complementary to that of said predetermined body shape.

15. The combination of claim 14, wherein said rotatable bracket component is interfaced with said body so that rotation of said rotatable bracket component causes rotation of said body.

16. The combination of claim 4, wherein:

said predetermined shape of said body comprises a plurality of body splines; and said predetermined shape of said aperture comprises a plurality of bracket splines, wherein said at least one cutting tab comprises a cutting tab at each bracket spline.

17. The combination of claim 16, wherein said bracket comprises:

a stationary bracket component for being affixed in non-moving relation to a selected object;

a rotatable bracket component having said aperture; and means for holding said body from rotating with respect to said stationary bracket component when said rotatable bracket component is rotated relative to said body;

wherein when said rotatable bracket component rotates relative to said body, said cutting tab of each said bracket spline cuts into a respective body spline of said body.

18. The combination of claim 17, further comprising means for defining a limit of rotation of said rotatable bracket component relative to said stationary bracket components; and further comprising means for resisting reverse rotation of said rotatable bracket component relative to said stationary bracket component after said relative rotation.

19. A method for automatically spacing a first object from a third object responsive to rotating one of the first object and a second object relative to the other said one of the first and second objects, said method comprising the steps of:

providing said first object having a predetermined object shape;

providing said second object having an aperture of a predetermined aperture shape;

forming at least one cutting tab at said aperture so as to define at least a portion thereof, wherein said cutting tab has a predetermined pitch angle relative to a plane of the second object; and rotating one of said first and second objects relative to the other of said first and second objects;

wherein said step of rotating results in said at least one tab cutting into the first object such that the first and second objects are caused to move relative to each other parallel to the pitch angle; and wherein said step of rotating results in the first object moving a distance along an axis which is perpendicular to the plane.

20. The method of claim 19, further comprising, after said step of forming:

placing the first object touchingly against a third object;

wherein said distance is equal to a gap formed between said first and third objects responsive to said step of rotating.

* * * * *